Dec. 11, 1934.  P. K. SAUNDERS  1,984,288
TWO-STROKE CYCLE INTERNAL COMBUSTION ENGINE
Filed March 3, 1932  4 Sheets-Sheet 2

Inventor
Philip K. Saunders
by Mawhinney & Mawhinney
Attorneys.

Dec. 11, 1934.  P. K. SAUNDERS  1,984,288
TWO-STROKE CYCLE INTERNAL COMBUSTION ENGINE
Filed March 3, 1932   4 Sheets-Sheet 4
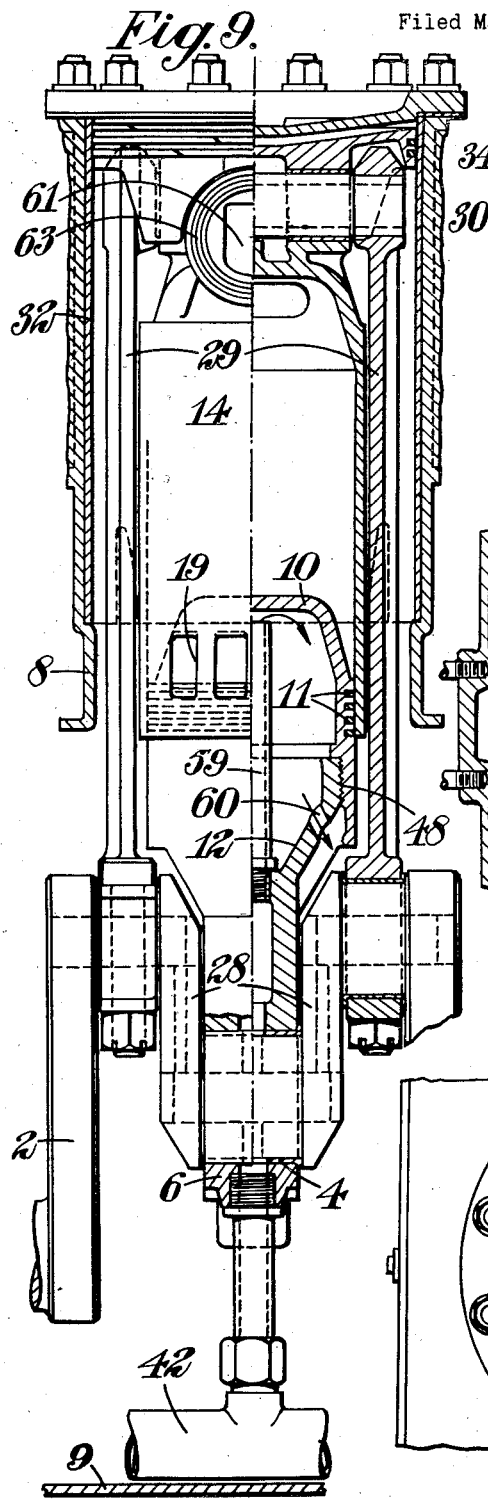
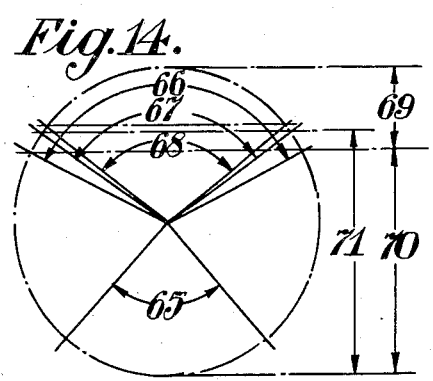
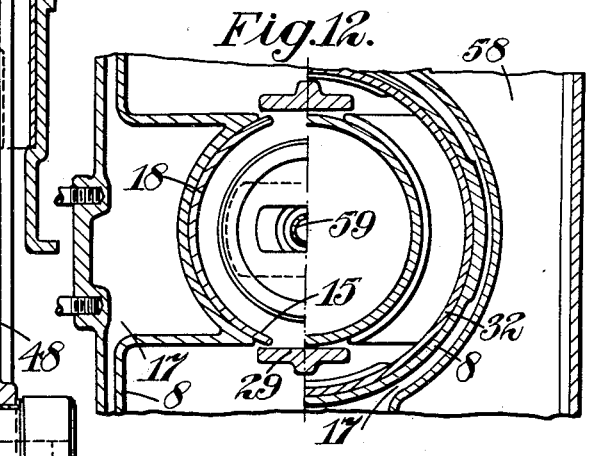
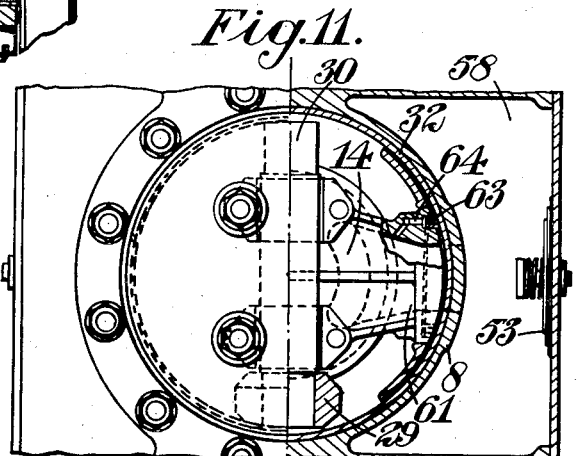
Inventor
Philip K. Saunders
by Mawhinney & Mawhinney
Attorneys.

Patented Dec. 11, 1934

1,984,288

UNITED STATES PATENT OFFICE 1,984,288

TWO-STROKE CYCLE INTERNAL-COMBUSTION ENGINE

Philip Keith Saunders, London, England

Application March 3, 1932, Serial No. 596,590
In Great Britain March 19, 1931

4 Claims. (Cl. 123—50)

This invention relates to single-acting internal-combustion engines of the kind that operate on the two-stroke cycle, and it has for its main object to provide an improved compression-ignition engine which will show good power/weight and power/size ratios compared with those of the conventional two-stroke or four-stroke engine.

With a conventional two-stroke engine the connecting-rod is always under compression, with the result that difficulty frequently arises in ensuring adequate lubrication of the big and little ends and the crankshaft bearings unless special care is taken in the construction thereof. A further object of the invention is to provide a construction in which this disadvantage is obviated.

A further object is to ensure that the working fluid is trapped and compressed at each end of each stroke to provide a cushioning effect, the gas pressure caused thereby being sufficient substantially to balance the momentum of the reciprocating parts. Thus, by this means, the connecting rod can be alternately placed in compression and tension, whereby the lubrication of the big and little ends and the crank-shaft bearings is facilitated.

A still further object is to provide improved means for cooling the reciprocating parts.

The invention involves a single-acting two-stroke internal-combustion engine having a working cylinder, hereinafter referred to as the reciprocal member, which is reciprocated over a stationary working piston and which is adapted externally at its closed end as a pump piston working in a stationary pump cylinder, such that the working fluid will be trapped in the head of each of the cylinders, respectively at the ends of each stroke of the reciprocal member.

With the above and other objects in view, I have devised the constructions illustrated in the accompanying drawings, to which reference is made in the following description.

In the accompanying drawings,

Figure 1 is a vertical sectional elevation of one construction of two-cylinder engine according to the invention, the left-hand cylinder being in longitudinal section, whilst in the right-hand cylinder the moving parts are shown in elevation, Figure 2 is a vertical cross-section taken on the line II—II of Figure 1, Figures 3–8 are diagrams indicating the air and gas flow and the different positions of the reciprocal member in the course of one cycle, whilst the crank turns through 360°, the air flow being indicated by arrows and the burning gas by "cotton-wool" shading, Figure 9 is a sectional elevation longitudinally of the crankshaft of a modified form of 2-stroke compression-ignition engine according to the invention, the left-hand half showing the moving parts in elevation, however, Figure 10 is a view transverse to the crankshaft, the left-hand half being a longitudinal sectional elevation while the right-hand half mainly shows the moving parts in elevation, Figure 11 is a part plan with the cover removed and cross-section, being taken on the line XI—XI of Figure 10, but with the piston omitted, Figure 12 is another cross-section, being taken on the line XII—XII of Figure 10.

Figure 14 is a timing diagram for the engine shown by Figures 9 to 13.

Like numerals indicate like parts throughout the drawings.

Figure 1:
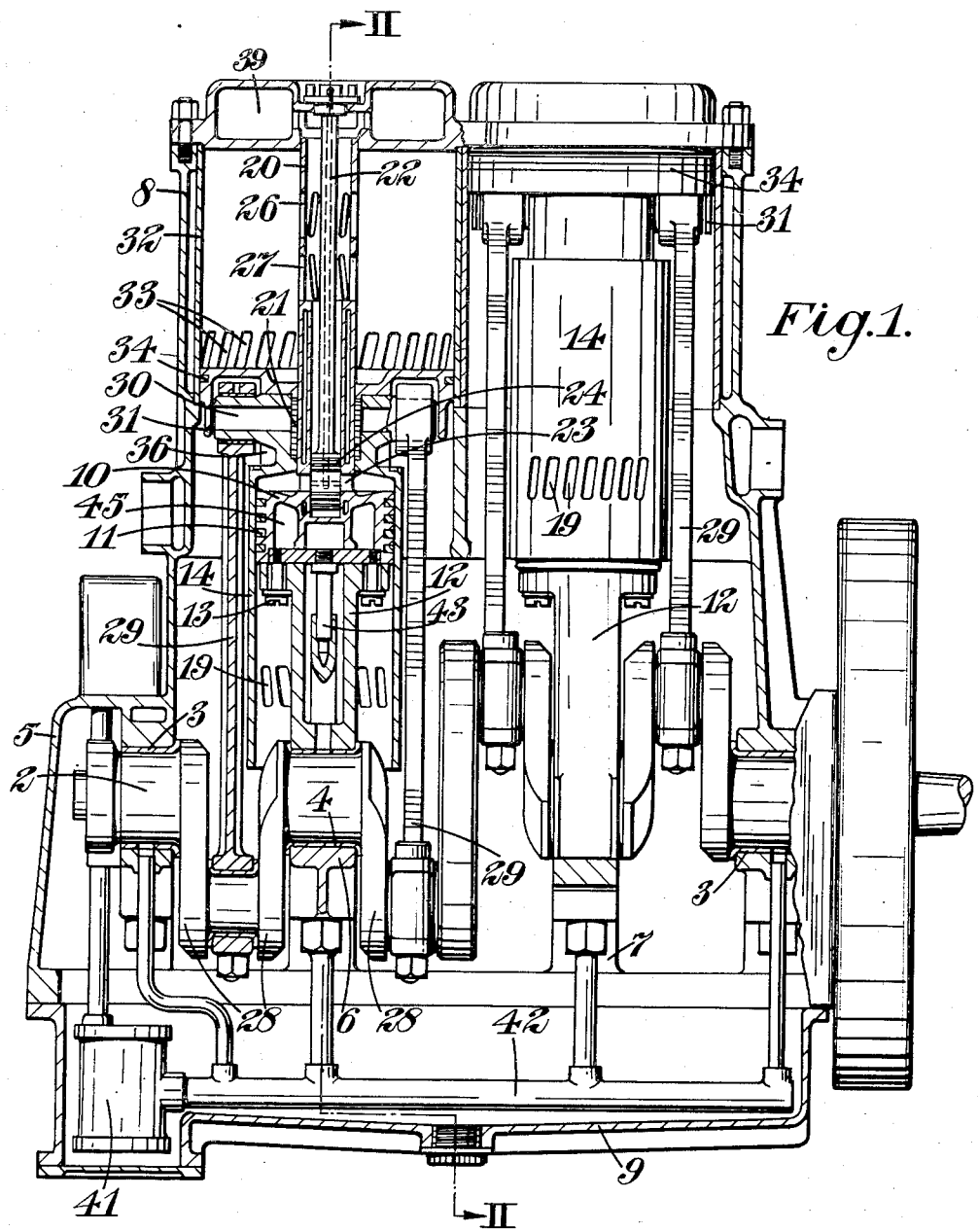
Figure 2:
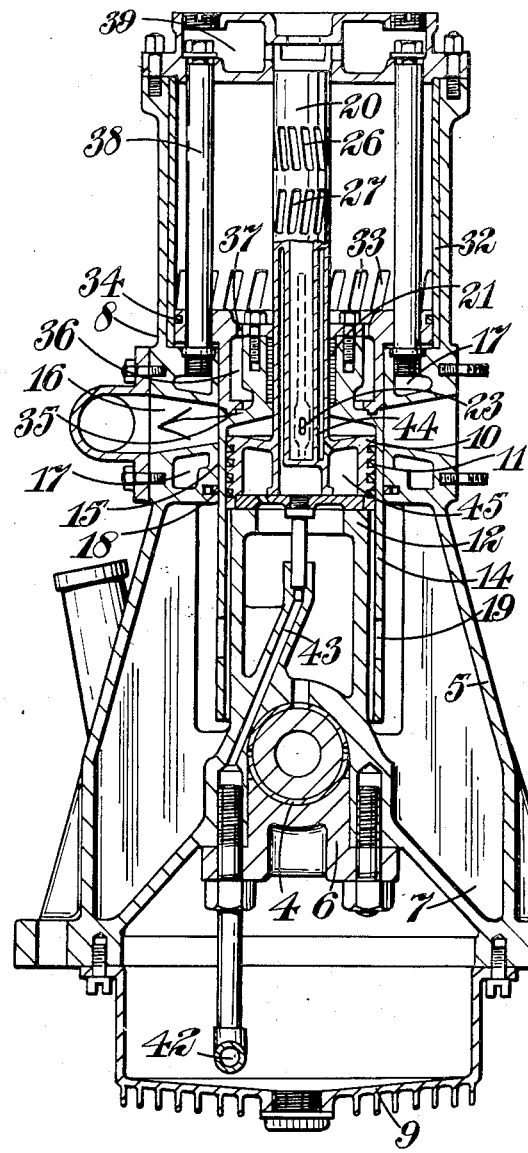

In the constructions illustrated, and particularly in that of Figures 1 and 2, the crank-shaft 2 is mounted in four main bearings in the crank-case, two of these bearings 3, 3 being at the ends whilst the other two 4 are in the line of the cylinder axes, respectively. The crankcase 5, bearing supports 6, webs 7 for the latter, and frame 8, etc., are formed of aluminum or light alloy, preferably of castings which can be detachably bolted together, the bottom plate 9 being provided with cooling fins.

For each working cylinder there is a stationary working piston 10 the head of which is of steel and carries peripherally a number of piston rings 11. This piston head rests upon a hollow aluminum or light alloy pedestal 12 in the lower part of which the bearing 4 for the crankshaft is mounted, and it is loosely secured thereto by means of screws 13 passed through from the underside. The pedestal, in cross section, is preferably of elongated form, as shown, its minimum width (shown in Figure 1) corresponding substantially to the axial length of the bearing 4, and its maximum width (shown in Figure 2) to the diameter of the piston.

Coaxial with the piston is the steel working cylinder, herein referred to as the reciprocal member 14, the external periphery of which is finished smooth. It is adapted to reciprocate with respect to the piston and is slidingly guided in faces 15 in the central part of the frame 8, as shown in Figure 2. This guiding part is provided with one or more transverse passages 16 and, in addition, provision is made at 17 for cooling it by internally circulating liquid which may be water or oil. Located at its inner face are inwardly-sprung packing members 18, or a set thereof, acting to engage the external periphery of the reciprocal member.

Towards its lower end the latter is provided with elongated ports 19 which become aligned with the exhaust openings 16 when it nears the upper end of its stroke.

The working piston 10 is formed with an upwardly-extending coaxial tubular member 20 of steel which reaches the top of the engine frame where it may be loosely supported by an aluminium top plate. The external periphery of this tubular portion is smooth and engaged by packing rings 21 provided in a corresponding bore through the closed end of the reciprocal member.

The fuel is injected through a hollow pencil 22 (not shown in Figure 2) located coaxially within the tubular extension 20 and detachably held at its upper end by the frame, the lower end of the pencil terminating in two oppositely-extending transverse passages which are aligned with corresponding outwardly-tapering passages 23 in the walls of the tubular extension just above the working piston. At its lower end the pencil fits tightly in the tubular extension, sealing rings 24 preferably being provided as shown.

Towards its upper end the extension is formed with two complete rings of ports through its wall, one 26 above the other 27, which function in a manner hereinafter described.

Each crank throw 28 is duplicated and comprises two similar parts on opposite sides of the main crankshaft bearing and each part carries a connecting-rod 29. The upper ends of the connecting-rods engage the ends of a wrist pin 30 on the reciprocal member which is preferably formed integrally therewith. To remove the possibility of the connecting rods coming off the ends of the wrist pin, the reciprocal member is formed with downwardly-extending portions 31 which lie over the ends of the wrist pin.

The upper external face of the reciprocal member is formed as an annular pump piston surrounding the tubular extension and working within a pump cylinder consisting of a steel liner 32 located in the upper part of the frame. An annular set of ports 33 provided in this liner constitutes the main atmospheric inlets.

The head of the reciprocal member is of aluminium bolted to the steel portion thereof and it preferably carries on its external periphery one or more piston rings 34 engaging the liner. At its lower end it is spigoted at 35, Figure 2, into the steel portion to provide a good heat-conducting joint. A cooling space 36 is left between the aluminium head and the centre steel portion which surrounds the tubular extension. This cooling space is vented to the interior of the pump cylinder by one or more small holes 37 through the head and is also in direct communication, along the connecting rods, with the interior of the crankcase.

In order to prevent the reciprocal member from twisting about its axis and thus jamming the connecting rods, provision is made for guiding it. Thus, a pair of parallel steel guide rods 38, 38 is arranged to extend between the top cover of the frame and the central guide surfaces, the head of the reciprocal member being a sliding fit thereon. The holes in the head through which these guide columns extend preferably lie on a diameter at right-angles to the axis of the gudgeon pin.

The operation of the engine is as follows:—

Figure 3:
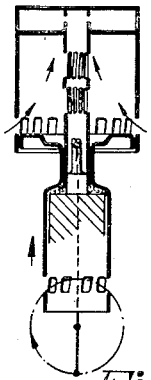
Figure 4:
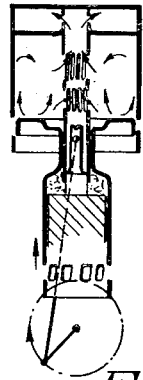

When the crank throw is at bottom dead centre, as shown in Figure 3, the working fluid is fully compressed between the cylinder part or interior of the reciprocal member 14 and the stationary working piston 10 and fuel injection is just occurring or is just about to occur. The interior of the pump cylinder is open to the atmosphere through the main inlet ports 33 and is, therefore, charged with air. As the reciprocal member 14 rises under the impulse of the burning gases the main inlet ports 33 in the pump cylinder wall are closed (Figure 4) and the contents of the pump cylinder are then compressed. The nett bore of the pump cylinder, that is, the gross bore less the external diameter of the tubular extension, is materially greater than the nett bore of the cylinder part of the reciprocal member, and by this means sufficient air for scavenging purposes is ensured.

Figure 5:

As the reciprocal member rises the packing 21 around the tubular extension uncovers the lower set of ports 27 therein, and as the upper set of ports 26 is not yet covered, the compressed air in the pump chamber is placed in communication through these two sets of ports with the underside of the reciprocal member. This first occurs about 60° or 50° before top dead centre. Figure 5 illustrates the members at this period.

Figure 6:
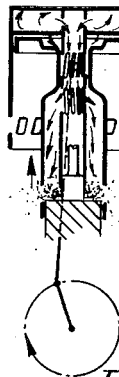
Figure 7:
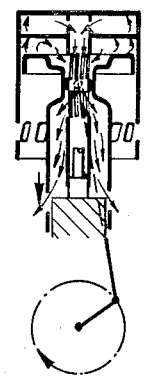

About 45° before top dead centre the ports 19 in the reciprocal member begin to come into line with the exhaust passages 16 in the guide bore, and thereupon exhaust takes place, the residue being forced out by the compressed air in the pump chamber, as shown by Figures 5, 6 and 7. Thus, there is a flow of scavenge air from the upper end of the working volume to the lower end and very complete scavenge is ensured.

As the reciprocal member rises further, when it is about 40° or 30° from top dead centre, the upper set of ports 26 in the tubular extension is closed, and thereafter a certain proportion of air which is trapped in the upper end of the pump cylinder is compressed as shown in Figure 6. This volume of air, and the pressure to which it is raised, is sufficient to balance the inertia of the reciprocating parts of the engine, and the connecting rods (which have previously been under tension) are thus placed under compression at the end of the outward stroke, so that oiling of the main and big end crank-shaft bearings and the wrist-pin bearings will be facilitated.

Figure 8:
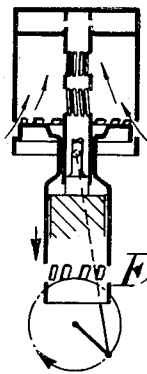

On the return stroke the reciprocal member at about 30° or 40° from top dead centre uncovers the upper set of ports 26 in the tubular extension, as shown in Figure 7, when the previously compressed scavenging air is again available by way of the two sets of ports in the tubular extension for assisting to drive out any exhaust residue from the previous charge. At about 45° after top dead centre the exhaust ports close, and thereafter the pressure in the pump cylinder serves for charging the working volume until the lower set of ports 27 is closed by the reciprocal member about 50° or 60° after top dead centre. Then commences the compression of the air between the cylindrical part of the reciprocal member 14 and the working piston 10, and in the pump cylinder 32 the pressure is reduced below atmospheric so that on the opening of the main inlet ports 33, about 45° before bottom dead center, the condition depicted by Figure 8, there is a rush of air which recharges the pump cylinder. The head of the pump cylinder may also be fitted with an inlet valve, if desired.

In the arrangement, as illustrated, the head of the pump cylinder, i. e., the top plate of the frame, is formed as a small storage chamber 39 permanently in connection with the upper end of the interior of the tubular extension. Thus, during the upward stroke of the reciprocal member, after the main inlet ports 33 have been closed (45° or so after bottom dead centre), air is being compressed into this storage chamber and also placed, when the necessary ports are open, in communication with the interior of the reciprocal member, as shown in Figures 5, 6 and 7. When, however, the reciprocal member on nearing the upper end of its stroke closes the top set of ports 26 (Figure 6), the previously-compressed air in the storage space will continue to discharge through the lower set of ports 27 into the interior of the reciprocal member, by which means a substantially continuous scavenging and fresh charge supply is provided during the period when the ports in the tubular extension are open.

A preferred oiling system involves the use of a high-pressure oil-circulating pump 41 which may be located in the base of the crankcase and which has an outgoing pipe 42 directed to the blocks in which the main bearings for each working cylinder are mounted. Thence the oil passage passes up through the centre of the hollow pedestal on which the stationary working piston is supported, as shown at 43 in Figure 2, into the interior of the tubular extension. This is provided with baffles 44 to guide the oil up one side to a point just beneath the lower set of ports 27—where there is a transverse wall separating the tubular extension into two parts, the top one for the air supply and the lower one for the oil. Here the oil is guided across to the other side of the tubular extension and then lead downwardly against the other wall to the lower end, whence it passes into an annular space 45 in the interior of the upper steel end of the stationary working piston, as shown clearly in Figure 2. From here it drains through the hollow pedestal into the main bearing, from which leads (not shown) are taken to the big-end bearings, after which the oil returns to the crankcase to be cooled.

It will thus be seen that the stationary working piston and the tubular extension on the same are oil-cooled. The reciprocal member is cooled partly by contact with the oil-cooled stationary piston, partly by external air currents and partly by external contact with the guide faces on the frame which, as mentioned above, may be oil-cooled or water-cooled.

It will be seen that whereas the main portion of the engine is of aluminium or light alloy the head of the stationary working piston and the main portion of the reciprocal member are of steel so that the working volume is at all times enclosed within steel. In operation the thrust loads on the reciprocal member as it reciprocates are taken mainly by the external guide faces on the frame and partly by the engagement of the pump piston head with the pump cylinder liner 32. The stationary working piston and tubular extension thereon can move as a whole laterally as necessary to preserve alignment with the working cylinder.

Figures 9 to 13 show the construction of a preferred arrangement according to the invention which differs mainly from that of the construction of Figures 1 and 2 in that the central tube 20 of the latter is omitted whilst the air receiver or storage chamber, instead of being at the upper end of the pump cylinder, is arranged on opposite sides of the periphery thereof.

Like numerals are applied to similar parts in the two constructions and the following differences will be noted. Instead of the piston head being secured to the pedestal 12 by screws 13, in this modification the head is shown as having a screw-threaded connection with the pedestal at 48. As stated, the tube 20 and associated parts such as the piston rings 21, the injector pencil 22, and the ports 26, 27 are omitted and instead fuel injection is effected through either or both the laterally-arranged nozzles 51 each with its end disposed in a hole 52 in the liner 32. The main admission valves 53 are automatic ones and the inlet ports 33 of the liner 32 are now arranged towards the upper end. The gudgeon pin 30, instead of being fixed to the reciprocal member, is floatingly mounted therein and keyed at 55 to the connecting rods 29. The air space 39 is replaced by the double air spaces 58, 58 on opposite sides of the pump cylinder, the inlet valves 53 being directly associated therewith.

The oiling system is modified in that oil from the pump delivery pipe 42 is discharged direct to the main bearings 4 and thence by the pipe 59 to the under surface of the stationary working piston, whence it drains through the hole 60 to the crank chamber. The oil path is indicated by arrows.

Figures 10, 13:
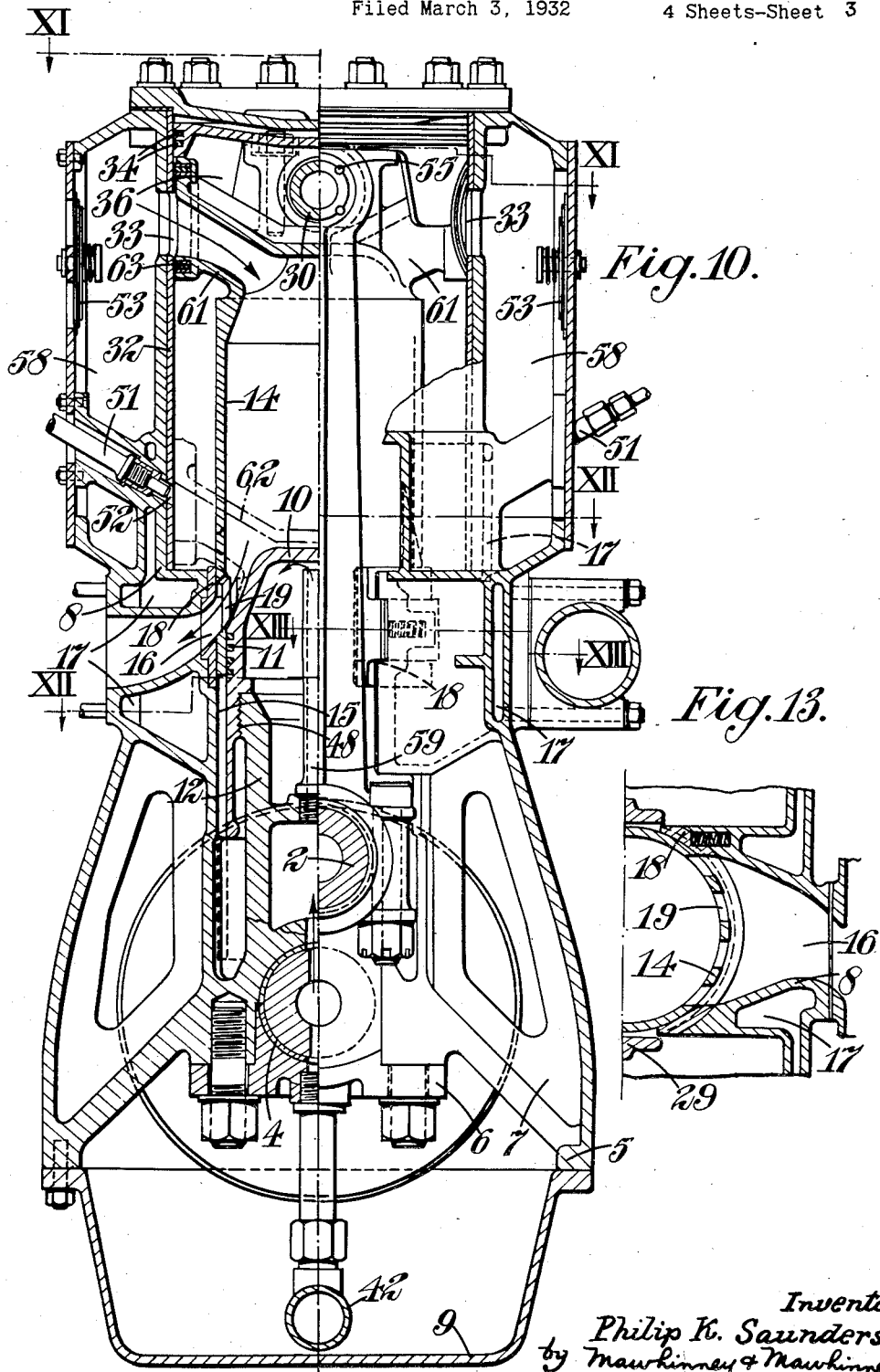
Figure 13 is a cross-section on the line XIII—XIII of Figure 10.

For charging the interior of the reciprocal member 14 and for injection purposes there are lateral extensions or necks 61 on the reciprocal member which co-operate with the inlet ports 33 when it is at or near top dead centre, as shown in full lines in the drawing, and with the fuel injection means 51 when at or near bottom dead centre, as indicated by the chain lines 62 in Figure 10.

It is believed that the operation of this construction will be easily understood from a consideration of the drawings and the earlier description. In one direction the cushion for the reciprocal member is provided by the working volume, and in the other direction air is trapped between the pump piston portion of the reciprocal member and the interior of the pump cylinder after the inlet ports 33 have been closed. The drawing shows the reciprocal member at the time when the exhaust ports 16, 19 are open and the scavenge air, compressed during the working stroke of the reciprocal member into the air spaces 58, is entering through the inlet ports 33 and necks 61. At the bottom of the stroke the clearance between the interior of the reciprocal member 14 and the stationary working piston 10 is a minimum, and the clearance volume is provided almost entirely by the necks 61. The openings to these are sealed against the liner 32 by the rings 63 co-axial with the neck openings, and the rings may be pressed outwardly (axially) by gas pressure acting on the small pistons 64, of which there are preferably three, as shown in Figure 11.

In the timing diagram of Figure 14, 65 is the angle (of 82°) during which injection must occur, i. e., while the necks 61 are aligned with the nozzle openings 52. The valve operations are preferably such that the cushion duration, 66, will be approximately 125°, the scavenge or inlet ports 33 will be open for about 110°, as shown by the angle 67, and the exhaust open for 105° or so, as shown by the angle 68. Thus, 69 represents the cushion duration, 70 the scavenge stroke, and 71 the power stroke. The scavenge ports open very slightly before the exhaust.

It should be noted that the cylinder head of the reciprocal member 14 is very adequately cooled inasmuch as:—

(a) Air passes right through the head—along the lateral necks 61;

(b) The top or piston surface of the reciprocal member is continuously in contact with air in the pump cylinder; and (c) The perimeter of the reciprocal member is approximately two and a half times that of the piston of an ordinary engine of the same power, by which means heat flow to the outer walls in which the reciprocal member operates is correspondingly increased.

By means of the invention it is possible to build a compression-ignition engine, operating on the two-stroke cycle, which has a height of only about 75% of the height of a conventional overhead-valve 4-stroke engine with the same bore and stroke. The crankshaft bearings are subjected to a reversed load at the end of each stroke, and thus very complete lubrication is facilitated. The engine can be made very light owing to the fact that it is mostly formed of aluminium or light alloy, except for the walls of the working volume (which are, as stated, of steel) in addition, of course, to the connecting rods and crankshaft. A large pump cylinder is provided without the size of the engine being increased, as the external diameter of the pump cylinder is less than the cross-section of the crankcase. In this way a scavenging displacement of 2½ times the total working volume, or more, can be obtained, and consequently it is possible to obtain super-charge, especially if the exhaust openings are relatively small.

The scavenging air enters the top of the working volume and travels downwardly, and owing to the use of tangential ports a swirling motion is introduced. Consequently, not only is very complete scavenging and combustion effected but side thrust on the reciprocating parts can be eliminated due to symmetrical arrangement of the ports.

As the ports mainly occur in single walls of steel, they can be milled out to be narrower than the usual cored type, whereby the possibility of ring breakages occurring is reduced.

What I claim as my invention and desire to secure by Letters Patent of the United States is:—

1. A single-acting two-stroke internal-combustion engine having a stationary working piston which consists of a steel head detachably secured upon a hollow aluminum support, a working cylinder which is reciprocated over said piston and is adapted externally at its closed end as a pump piston, and a stationary pump cylinder in which said pump piston works, the parts being arranged such that sufficient working fluid will be trapped in the head of each of said cylinders, respectively, at the ends of each stroke substantially to balance the momentum of the moving parts.

2. A single-acting two-stroke fuel-injection internal-combustion engine having a stationary working piston, a working cylinder which is reciprocated over said piston and is adapted at its closed end as a pump piston, a stationary pump cylinder in which said pump piston works, and a hollow fuel injection member opening through the working cylinder head into the compression space thereof.

3. A two-cycle internal combustion engine having a crank case with an outer fixed cylinder thereon and laterally disposed air chambers opening through the upper portion of the cylinder into the latter, said crank case having a crank shaft bearing therein with a fixed pedestal rising from the bearing and terminating in a fixed piston, and a slidable cylinder disposed between the piston and the outer cylinder and having upper and lower ports adapted when the sliding cylinder is raised to communicate with said air pockets and with the atmosphere for scavenging the interior of the sliding cylinder, the head of said sliding cylinder providing an air pump piston adapted to compress air into the upper end of said outer fixed cylinder and into the air pockets for storing air under pressure and for checking the rise of the sliding cylinder.

4. A two-cycle internal combustion engine having a crank case with a fixed cylinder thereon and lateral air pockets opening into the upper end of the cylinder near the top thereof, a sliding cylinder mounted in the outer fixed cylinder and having ports at its upper end for communication with said air pockets when the sliding cylinder is raised, a fixed piston mounted in the crank case and projecting into the sliding cylinder, a crank shaft mounted in the crank case, connecting rods between the crank shaft and said sliding cylinder, charge injecting means carried upon the outer cylinder for communication with the sliding cylinder when the latter is lowered, said outer cylinder having air exhaust ports at its lower end and said sliding cylinder having air exhaust ports at its lower end for communication with the exhaust ports of the outer cylinder when the inner cylinder is raised whereby air compressed in the air pockets may scavenge the interior of the sliding cylinder, said piston and said sliding cylinder providing an air cushion at the lower end of the stroke of the sliding cylinder to check the movement thereof and said sliding cylinder and said outer fixed cylinder providing an air cushion for checking the outward movement of the sliding cylinder.

PHILIP KEITH SAUNDERS.